(No Model.)

G. A. HOUSTON.
PIPE CONNECTION FOR RAILROAD CARS.

No. 415,273. Patented Nov. 19, 1889.

Witnesses
Harry Bitner
W. M. Hill

Inventor
George A. Houston
By his Attorneys
Hill & Dixon

UNITED STATES PATENT OFFICE.

GEORGE A. HOUSTON, OF BELOIT, WISCONSIN.

PIPE-CONNECTION FOR RAILROAD-CARS.

SPECIFICATION forming part of Letters Patent No. 415,273, dated November 19, 1889.

Application filed June 23, 1888. Serial No. 278,014. (No model.)

*To all whom it may concern:*

Be it known that I, GEORGE A. HOUSTON, a citizen of the United States of America, residing at Beloit, in the county of Rock and State of Wisconsin, have invented a certain new and useful Pipe-Connection for Railroad-Cars, of which the following is a specification.

Figure 1:
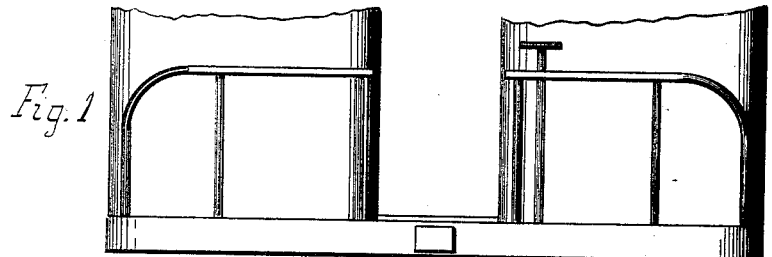
Figure 2:
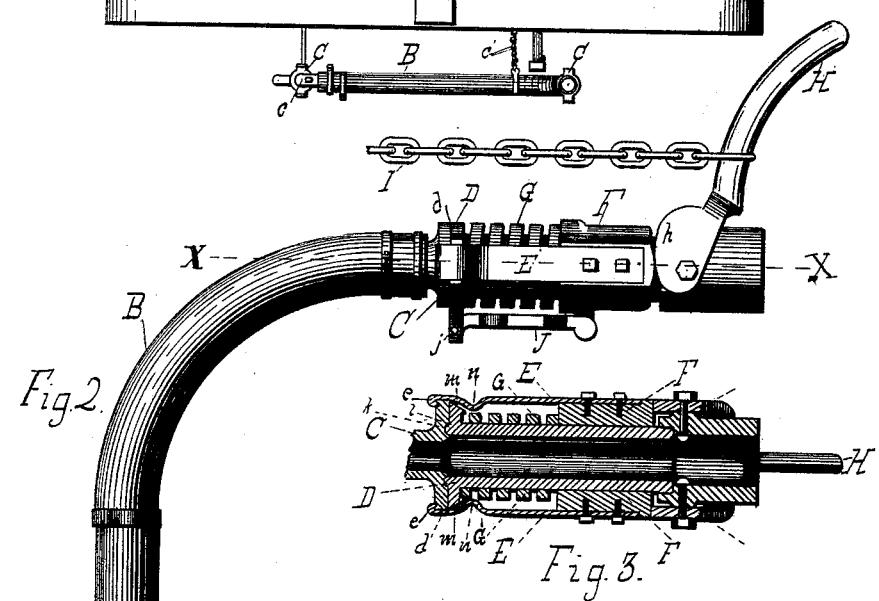
Figure 3:
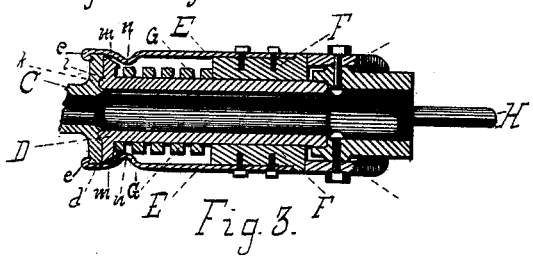

Referring to the drawings, in which similar reference-letters indicate the same or corresponding parts, Figure 1 is an end view of a railroad-car, showing the manner of attaching my new pipe-connection. Fig. 2 is a top view of said connection, and Fig. 3 is a vertical cross-section of my improved coupling in the line $x\ x$ of Fig. 2.

For the purposes of steam-heating it is customary to provide railroad-cars with fixed iron pipes arranged under the bottom of the cars and to connect the pipes of one car to those of another by means of a short flexible hose extending between the cars. The flexible hose is made in two sections permanently attached at one end to the iron pipes and coupling together at the other end midway between the cars, and, being necessarily made of sufficient length to accommodate itself to the varying movements of the coupled cars, it hangs in a catenary curve, and is therefore liable to become partially filled and choked with condensation water, thus obstructing the steam-circulation through it and endangering the freezing of the pipes in cold weather. When the pipes become obstructed, it is not always easy for the trainmen to ascertain the exact locality of the obstruction nor to remove it when found, and from such obstructions and other causes the pipes are liable to be subjected occasionally to overpressure, with the result of bursting them or starting their joints to leaking.

The object of my invention is to provide such a means of connecting the fixed pipes of two adjacent cars as will not be subject to the disadvantages above indicated. To this end, first, I so construct, connect, arrange, and support the flexible hose that it will not hang in a catenary curve between the cars, as heretofore, but will lie in a substantially horizontal plane, and therefore form no pocket or bight for the collection and retention of condensation water; secondly, I couple the flexible hose to the iron pipes by means of a coupling which, when subjected to an undue pressure of steam in the pipes, will partially open and allow the excessive pressure to blow off, and will then close again steam-tight without uncoupling the connection; thirdly, I provide means by which the train-men can at any time effect by hand this partial opening of the joint, thereby enabling them to readily test the steam-circulation at the different connections, and if they find any accumulation of water in the pipes to blow it off and close the joint without uncoupling. The improved connection by which I effect these results is also capable of automatically uncoupling when the cars separate from each other.

Instead of making the connecting-hose of two pieces, each permanently attached to the iron pipes, and coupling them together at their free ends midway between the cars, as heretofore, I construct it in one piece B and provide each of its ends with a tubular metallic plate or block C, adapted to be detachably coupled to the end of the adjacent iron pipe in the manner of an ordinary butt-coupling. The connection of the hose to at least one of the two plates or blocks C is effected by means of a goose-neck or elbow $c$, formed on said block and curved or otherwise turned horizontally to an angle of about ninety degrees to the iron pipe to which the block couples. The hose itself, although sufficiently flexible for the purposes of its use, is made quite stiff, and when in place extends from the elbow $c$ for some distance transversely of the car, and thence bends around and passes across the space between the cars in a line substantially at a right angle to the transverse portion and couples to the iron pipe of the opposite car. The transverse portion, which lies under the platform of the car first mentioned, is provided with a support $c'$, of any suitable character, to prevent it from sagging, and the hose is made sufficiently stiff to maintain its horizontal position from car to car with the aid of this support. The entire hose thus lies in a horizontal position, with its two ends extending at an angle of about ninety degrees from each other and forming arms, which accommodate themselves perfectly to the limited longitudinal, vertical, and lateral play of the cars when in motion, so that such movements occasion merely a slight flexure of the pipe substantially without torsion, thereby materially lessening the injurious strains upon it and causing it to wear much longer and remain in better condition than when arranged and connected as heretofore, besides substantially preventing the formation of any pocket or downward bend and the consequent accumulation of water in the connections.

In order to enable the train-men to ascertain the locality of any accidental obstruction in the train-pipes and to blow out any water that may accumulate therein, I couple the plate or block C of the hose to a coupling-head D of the iron pipe, after the manner of a butt-coupling, by means of straps or bars E, attached to one of the members C D and capable of detachable connection to the other, and I make one of said members C D capable of sliding to a limited extent away from the other against the resistance of a spring, so that the joint between the two coupling members can be slightly opened without uncoupling them.

The best way in which I have contemplated the embodiment of this new principle is shown in the drawings, in which the straps or bars E are provided with a retaining-shoulder or hook $e$ and made of spring metal, so as to lock over the edge of the member C and retain it in place, and are attached to a ring or sleeve F, which slides upon the tubular portion of the member D, and is normally pressed back from the direction of the coupling-joint $d$ by means of a coiled spring G. By forcing the sleeve F forward toward the coupling-joint against the resistance of the spring G the joint will be opened to a limited extent for the escape of the fluid contained in the pipe without uncoupling the connection. A forked cam-lever H behind the ring is so arranged that when its free arm is thrown slightly forward it will, by the action of the cam-surface $h$ against the rear portion of the sleeve, force the latter slightly forward, so as to open the joint sufficiently for the purpose referred to, and upon releasing the lever the spring G will automatically close the joint again. The cam-lever is so arranged that it can be operated from the platform or steps of the car, so that if the pipes are found to be choked the train-men can pass along from car to car and by opening the joints successively ascertain the exact location of the obstruction, and if it be of a fluid character discharge it through the partially-opened joint, and thus relieve the pipes.

In order to enable the separating of the cars to automatically uncouple the connection, I extend a cord or chain I from the free arm of the lever H to the platform of the opposite car, so that the cars in the act of separating from each other will draw the lever forward, and thus force the hooked bars E forward, relaxing their grip upon the coupling member C, and I provide an incline $m$ on the outer side of the member D and a cam-shoulder $n$ on the inner side of the spring-bars E, so arranged with relation to each other that when said spring-bars are forced forward to or nearly to the full extent of their possible movement in that direction the shoulder will ride up on the incline and spread the bars apart till they disengage the member C and allow it to uncouple and drop; but when said bars E are moved forward only far enough to open the joint $d$ to blow off the steam or water the shoulder $n$ will not ride up on the incline and uncouple the connection.

The construction of the apparatus in such manner that while the coupling members remain connected together one of them can yield slightly, so as to open the joint to a limited extent, and will then automatically close it tight, as before, enables me to combine the two functions of a coupling and an automatic blow-off or safety valve in one and the same structure. The force of the contained fluid-pressure in the pipe, acting against the outer or concave wall of the elbow $c$, tends to force the movable member C away from the fixed member D, and if the counteracting force of the spring G be so adjusted as to be overcome by the action of any given fluid-pressure—say fifty pounds to the inch—within the pipe through its pressure on the elbow $c$, as aforesaid, then the joint $d$ will slightly open at any pressure exceeding fifty pounds to the inch and allow the excess to blow off, after which the spring will again close the joint. The same effect will be produced by enlarging the bore of one of the members C D slightly beyond that of the other at the joint $d$, or plane of contact, as shown in Fig. 2, so as to make the surfaces differential, in which case they will tend to separate under the operation of the fluid-pressure, on the general principle of a differential valve.

To insure steam-tight contact of the meeting surfaces at the joint $d$, and also to support the member C when the joint is partially opened, one of said surfaces may be provided with an annular groove $k$ and the other with a similar rib $l$, which will wedge into the groove when the parts are brought together, and thus insure a complete closing of the joint, and which will also keep the parts properly centered when the joint is slightly open.

The coupling is easily effected by simply drawing the cam-lever forward, so as to spread the spring-bars E, bringing the faces of the blocks C D together and throwing the cam-lever back to its normal position. A forward movement of the cam-lever to spread the side bars E will uncouple the connection whenever desired.

Each of the couplings is preferably provided with a cover J, constructed substantially like the detachable member C, except that it has no central opening and no elbow $c$. This is kept in a convenient position to be used for closing the pipe at the rear end of the rear car, and to prevent it from being lost or misplaced it may be connected to the structure in any suitable way—for example, by a hinge *j*. I provide each car with one or more of the complete connections, consisting of the hose B, with its attached end plates C C, which may be kept in any suitable place in the car, so as to be ready for use when needed.

In case any hose should burst or become damaged, it will require only a moment's work to detach the damaged connection and substitute a new one in its place. The end which is provided with the elbow *c* should preferably be connected to the member D, whose cam-lever is connected to the chain I, so that the transverse portion of the hose will be first uncoupled when the cars separate, and will thereby be saved from injurious torsion.

The chain I is made of such length as to uncouple the members C D before any strain is brought upon the hose, but to permit the ordinary oscillations of the cars to take place without drawing upon the cam-lever H.

The essential principles of my invention—to wit, the leading of the flexible hose part way across the car to and over a suitable support and then directly across to the other car, the making of one of the coupling members capable of yielding slightly from the other in a direction in line with the pipe and against the opposition of a spring, the coupling of the two members by retaining devices that uncouple only by a lateral or spreading movement, and the combination of the longitudinally-movable coupling member with the laterally-movable retaining device, so that a full movement of the former will unlock the latter, while a partial movement will not—are obviously capable of separate as well as combined embodiment, and in a great variety of forms, of which the one represented in the drawings has been selected for purposes of illustration, because it embodies all of said principles in one structure and has been thoroughly tested by practical use.

Having thus described my invention, what I claim as new, and desire to secure by Letters Patent, is—

1. In a pipe-connection for railway-trains, the combination of the following elements, viz: car-pipes so arranged that when two cars are coupled together the proximate ends of said pipes will come at opposite sides of the car-coupling, and a stiff but flexible intermediate connecting-hose having two terminal coupling members, one of which members is adapted to be attached to one of said pipes by a straight connection and the other to the other pipe by an elbow *c*, which curves in a horizontal plane from the pipe toward the opposite side of the car, whereby when the hose is attached it will lie in a horizontal position, with one end extending transversely of the car to which it is attached and the other end extending longitudinally of the car to which it is attached, for the purpose of enabling the hose to accommodate itself more easily to the movements of the cars, and thus saving it from injurious strains, substantially as described.

2. In a pipe-connection for railway-trains, a combined pipe-coupling and safety-valve consisting, essentially, in the combination of two abutting coupling members C D, in one of which the central passage or port is curved or made smaller than that of the other to enable the pressure of the contained fluid to tend to force them apart, a ring or sleeve F, mounted on one of said members and adapted to be moved toward the other, a spring G to resist said movement of the sleeve F, and two spring-latches E E, affixed at one end to said sleeve or ring, so as to lie substantially parallel to the pipe, and provided at the other end with hooks or retaining-shoulders adapted to engage over a projecting edge of the other coupling member, whereby one of said coupling members, under the influence of excessive pressure in the pipe, is enabled to move slightly away from the other and allow the excess of pressure to blow off without uncoupling said members, and is then automatically caused to move back and close the joint by the action of the spring G, substantially as described.

3. In a pipe-connection for railway-trains, the combination of the coupling members C D, a block F, sliding upon one of said members, a spring G, adapted to force said block in a direction away from the other member, and a spring latch or latches E, adapted to connect said block to the opposite member with a lever H, for the purpose of applying a sufficient force to compress the spring G, and thereby allow said members to be coupled or uncoupled, substantially as described.

4. In a pipe-connection for railway-trains, the combination of the coupling members C D, a block F, sliding upon one of said members, a spring G, adapted to force said block in a direction away from the other member, and a spring latch or latches E, adapted to connect said block to the opposite member, and the lever H, with a chain I, connecting the arm of the lever with the opposite car, for the purpose of applying automatically upon the separation of the cars a sufficient force to compress the spring G and allow said members to uncouple, substantially as described.

5. In a pipe-connection for railway-trains, the combination of the coupling members C D, a block F, sliding upon one of said members, a spring G, adapted to force said block in a direction away from the other member, and a spring latch or latches E, adapted to connect said block to the opposite member, with the incline *m*, arranged on the outer edge of the coupling member to which said latches are attached, and the bend or protuberance *n*, arranged on the spring-latches, so as to ride up and down on the incline $m$ when said latches are forced to move forward and back, substantially as described.

6. In a pipe-connection for railway-trains, the combination of the coupling members C D, a block F, sliding upon one of said members, a spring G, adapted to force said block in a direction away from the other member, and a spring latch or latches E, adapted to connect said block to the opposite member, with the guide-rib $l$ and groove $k$, for the double purpose of closing the joint tight when the coupling members are in contact, and centering and guiding the movable member when the joint is slightly opened without uncoupling to blow off an excess of pressure, substantially as described.

GEORGE A. HOUSTON.

Witnesses:
HARRY BITNER,
T. S. E. DIXON.